United States Patent [19]

Gallucci et al.

[11] Patent Number: 5,226,544
[45] Date of Patent: Jul. 13, 1993

[54] REUSABLE PALLET WRAPPER

[75] Inventors: Frank Gallucci; Gerry Shackleton, both of Calgary, Canada

[73] Assignees: Amici Enterprises Inc.; Trimeg Holdings Ltd., both of Calgary, Canada

[21] Appl. No.: 810,142

[22] Filed: Dec. 19, 1991

[51] Int. Cl.⁵ .............................................. B65D 19/00
[52] U.S. Cl. ..................................... 206/597; 206/386; 150/154
[58] Field of Search ........................ 206/386, 597, 600; 150/154, 157, 158, 165; 224/328; 24/573.7

[56] References Cited

U.S. PATENT DOCUMENTS

| | | | |
|---|---|---|---|
| 1,068,066 | 7/1913 | Martin | 150/154 |
| 1,647,169 | 11/1927 | Anton | 150/154 |
| 2,455,237 | 11/1948 | Davis | 150/154 |
| 2,992,668 | 7/1961 | Collard | 150/165 |
| 3,088,619 | 5/1963 | Boucher | 220/1.5 |
| 3,371,815 | 3/1968 | Macomber | 206/597 |
| 3,425,472 | 2/1969 | Marino | 150/50 |
| 3,491,847 | 1/1970 | Abbott | 150/154 |
| 3,556,448 | 1/1971 | Dobbs | 248/119 |
| 3,659,641 | 5/1972 | Marino | 150/52 |
| 4,179,950 | 12/1979 | Valley | 150/154 |
| 4,538,385 | 9/1985 | Kandarian | 150/154 |
| 4,674,787 | 6/1987 | De Vera | 150/154 |
| 4,852,330 | 8/1989 | Carangelo | 206/386 |
| 4,868,955 | 9/1989 | Magnant et al. | 24/306 |
| 4,876,841 | 10/1989 | Jensen | 53/399 |

FOREIGN PATENT DOCUMENTS

| | | | |
|---|---|---|---|
| 719927 | 3/1980 | U.S.S.R. | 206/597 |

Primary Examiner—David T. Fidei

[57] ABSTRACT

The present invention relates to a reusable pallet wrapper used to secure palletized cartons stacked onto a pallet. The wrapper includes a flexible panel with rigid reinforcement at two ends. Straps are attached to one rigid end of the wrapper, and buckles are attached to the other rigid end of the wrapper. When the straps are inserted through the buckles and tension applied the wrapper panel will be secured around a stack of palletized objects with even tension across its width. This wrapper reduces the amount of damage to articles being wrapped.

6 Claims, 3 Drawing Sheets

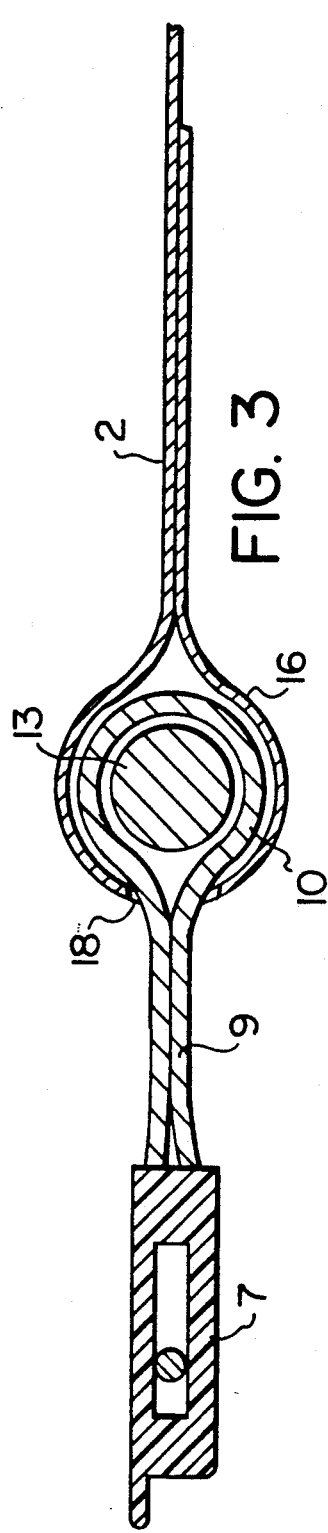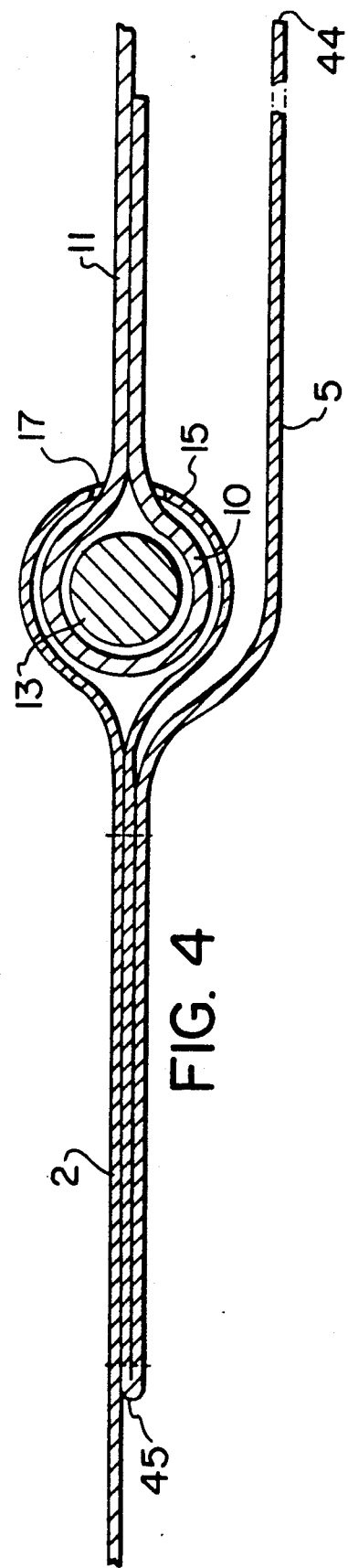

REUSABLE PALLET WRAPPER

FIELD OF THE INVENTION

This invention relates to a reusable device for securing palletized materials. In particular, the pallet wrapper of this invention can be used for stabilizing a cluster of articles on a pallet, which will be transported on a vehicle such as a cart, lift truck, truck, trailer or railcar.

BACKGROUND OF THE INVENTION

In commercial and industrial establishments a cluster of boxes, cartons or other objects must be transported from one location to another. For example, in warehouse situations a large number of articles such as cartons stacked on a pallet are transported on a fork lift truck from a storage area to a shipping area or directly onto a truck, trailer or railcar for further distribution. In addition, pallet wrappers can be used extensively in retail stores where a large number of articles such as boxes are transported on a hand pushed cart from a storage area to various locations in the store where the individual items will be placed on display for customers.

When a fully loaded pallet is transported, turning the cart or truck too rapidly or bumping into shelving or walls results in the articles falling off of the pallet. During transportation on a truck, trailer or railcar, pallet loads tend to move and shift with the movement of the vehicle. In addition, there are occasions when simply running the cart or truck over a rough surface in a warehouse, causes the load of articles to fall off of the pallet. A collection of differently shaped or irregularly shaped articles can be especially unstable.

PRIOR ART

As a result of this need to keep clusters of articles from falling off a pallet during transportation many pallet wrapper devices have been proposed.

For example, in U.S. Pat. No. 4,868,955 issued on Sep. 26, 1989, a device for stabilizing a cluster of articles is disclosed. This invention describes a wrapper for palletized material made of a resilient fabric such as nylon having a large sheet of Velcro (Trademark) on one end thereof. The invention also discloses variations in which the wrapper is constructed of two parts joined by straps and buckles. The straps are sewn to the body material.

U.S. Pat. No. 4,876,841 issued on Oct. 31, 1989, describes a similar wrapper for palletized material formed from a flexible sheet with Velcro (Trademark) faces and straps. This invention also shows the straps being sewn to the body material.

Prior art reusable pallet wrappers, as described above, are unsatisfactory because they can cause excessive pressure points on the cartons resulting in damage to the product being wrapped. This can occur because the straps are sewn or directly attached to the material body. The pressure on the cartons being retained by the wrapper tend to be in line with the tightened straps thereby causing the cartons or boxes in line with the straps to be subjected to excessively large forces that may cause damage to the product in the cartons. This localized pressure is caused by the unequal distribution of force along the width of the wrapper.

In addition, when the wrapper is in place, particularly on uneven loads prior art wrapper material tends to buckle or bulge in the tightening area, possibly allowing small pieces to fall off the pallet. This is particularly evident in cases where the pallet contains a stack of relatively small items that are not packed in larger cartons.

SUMMARY OF THE INVENTION

An object of the present invention is to provide a reusable pallet wrapper that can be used on regular, irregular and variable sized loads. The pallet wrapper will be installed easily with a series of straps and buckles where the tension of the wrapper is evenly distributed across the width of the pallet to eliminate any pressure points on the cartons disposed on the pallet. In addition, the wrapper will provide a rigid line across the width of the wrapper to prevent any buckling or bulging of the wrapper material.

A further object of the present invention is to provide a device for securing palletized material, which is efficient in operation, simple in construction and durable in use.

To reduce the problem of pressure points on wrapped material and bulging of the wrapper material, the present invention provides a reinforcing rod disposed at two opposing ends of the pallet wrapper with a series of straps and buckles attached to the rods.

In accordance with an aspect of this invention there is provided a device for use in stabilizing a cluster of articles, comprising a wrapper panel of flexible material having a first and second end and an upper and lower edge extending over the length of said wrapper panel, a first rigid reinforcing means disposed along said first end, a second rigid reinforcing means disposed along said second end, at least one attachment strap means having a free end and a fixed end, said fixed end being attached to said first reinforcing means, at least one strap receiving means having a free end and a fixed end, said fixed end being attached to said reinforcing means, and wherein said free end of said attachment strap means is engaged with said free end of said strap receiving means with said wrapper panel being adapted to be positioned around said cluster of articles resulting in an even tension across the width of said wrapper panel by said first and second reinforcing means.

A more detailed description of preferred embodiments of the new reusable pallet wrapper will now be set forth in reference to the drawings.

DESCRIPTION OF THE DRAWINGS

In the drawings, wherein like numerals of reference indicate corresponding parts in the various figures, in which:

FIG. 3 is sectional view taken along line 3—3 of FIG. 2;

FIG. 4 is sectional view taken along line 4—4 of FIG. 2; and

DETAILED DESCRIPTION OF PREFERRED EMBODIMENTS

Figure 1:
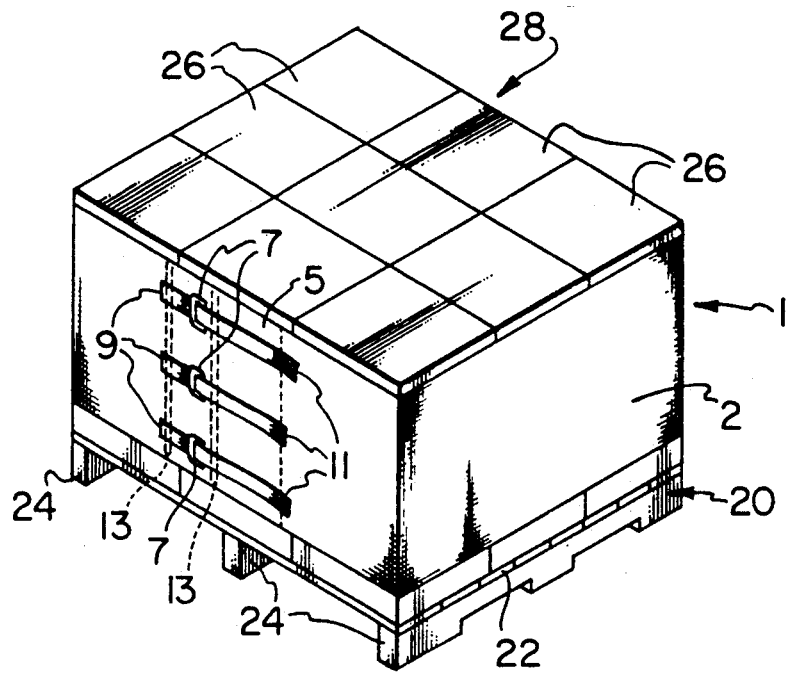
FIG. 1 is a perspective view of a stack of palletized materials having a reusable pallet wrapper of the present invention positioned in place thereon.

FIG. 1 illustrates a pallet 20 having a horizontal platform 22 and a plurality of elongated upstanding ribs 24, which support platform 22 in spaced relation above a supporting surface. Supported on platform 22 are a plurality of cartons or packages designated generally by numeral 26. The cartons or packages 26 are piled up on one another to form a stack 28. The cartons 26 in stack 28 shown in FIG. 1 are regular in shape, however the particular shape and size of the containers can vary without detracting from the invention.

Figure 2:
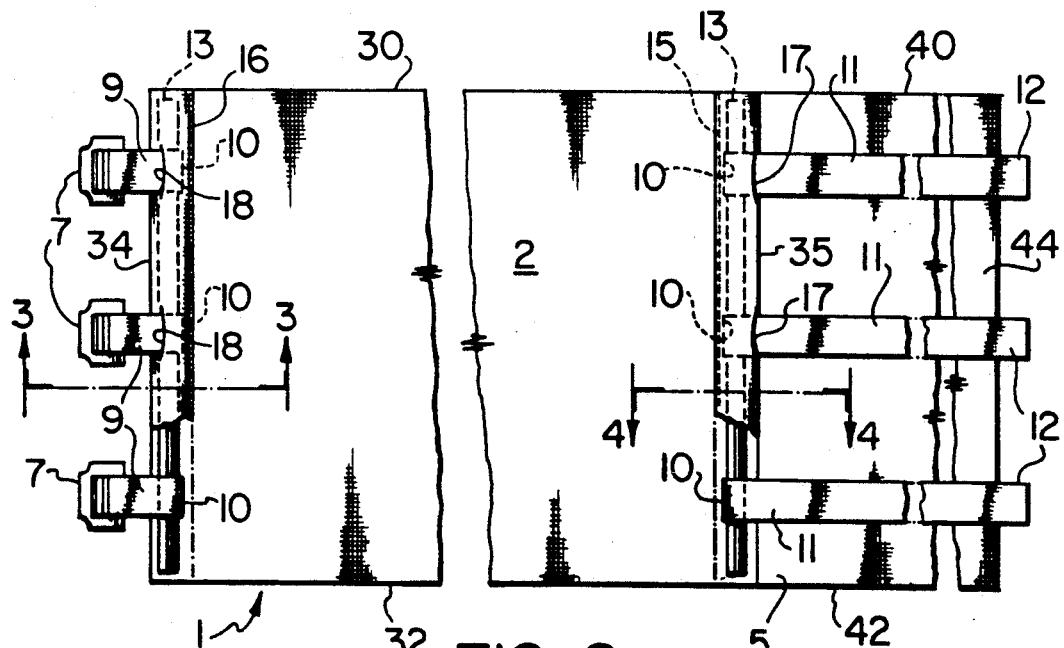
FIG. 2 is a plan view of the reusable pallet wrapper of the present invention.

Surrounding stack 28 of cartons 26 in FIG. 1 is a pallet wrapper 1 having a flexible primary wrapper panel 2 and a wrapper flap 5. The wrapper panel 2 has an upper edge 30, a lower edge 32 and opposite ends 34–35 as shown in FIG. 2. The wrapper flap 5 has an upper edge 40, a lower edge 42, a free end 44 and a fixed end 45 attached to end 35 of panel 2. Flap 5 can be either an extension of panel 2 or a separate add-on portion. Flap 5 could also extend from end 34 or both ends 34 and 35 of panel 2.

Flap 5 is used in cases where the perimeter of stack 28 exceeds the length of wrapper panel 2. Flap 5 is used to cover exposed cartons 26 between ends 34–35 of panel 2 when panel 2 is wrapped around stack 28 thereby permitting use of the pallet wrapper 1 on variable sized pallet loads, i.e. the perimeter distance of stack 28 may vary and still be accommodated by pallet wrapper 1.

It is not necessary that panel 2 have a width between the upper and lower edges 30–32 sufficient to cover the entire height of stack 28. For example, it would be sufficient for the height between edges 30–32 to be between approximately one-third and one-half of the height of the entire stack 28. In particular, the width of panel 2 depends on the product being wrapped and on the customer's needs. In some instances, the top two tiers of a properly cubed pallet need only be wrapped, whereas a pallet load of onions, or similar product, in bags or sacks will require the width of panel 2 to be-tween approximately three-quarters and the full height of pallet stack 28.

In addition, flap 5 does not necessarily have to be as wide as panel 2. Minor variations in the width of flap 5 with respect to the width of panel 2 can be made without detracting from the invention.

Panel 2 and flap 5 may be made of any material of sufficient strength such as woven polypropylene, canvas or nylon.

A strap sleeve 15 is formed along end 35 of panel 2. Sleeve 15 has a plurality of strap slots 17 approximately the same length as the width of a tightening strap 11.

A buckle sleeve 16 is similarly formed along end edge 34 of panel 2. Sleeve 16 has a plurality of buckle slots 18 approximately the same length as the width of a buckle strap 9.

Rods 13 are disposed within sleeves 15 and 16 and are used to retain a plurality of tightening straps 11 and a corresponding plurality of buckle straps 9. Rods 13 could be of any suitable configuration, such as round, square or rectangular. Rods 13 are approximately as long as the width of panel 2 and made of any suitable rigid material, such as plastic, wood or metal.

A plurality of buckles 7 are attached to one end of each of the plurality of buckle straps 9, which have loop ends 10 formed at the other end thereof. The loop ends 10 of buckle straps 9 are engaged around rod 13 at end 34 of wrapper panel 2, see FIG. 3. A small portion of each of the buckle straps 9 with buckles 7 attached thereto project from buckle slots 18 of buckle sleeve 16. Rod 13 is retained in buckle sleeve 16 by closing the open ends at upper and lower edges 30–32 of sleeve 16 by sewing or other means.

Tightening straps 11 of suitable length are provided having free ends 12 and loop ends 10. The loop ends 10 of straps 11 are engaged around rod 13 at end 35 of wrapper panel 2, see FIG. 4. The free ends 12 of straps 11 project from strap slots 17 of strap sleeve 15. Rod 13 is retained in sleeve 15 by closing the open ends at upper and lower edges 30–32 of sleeve 15 by sewing or other means. The tightening straps 11 and buckle straps 9 can be made from a suitable material such as polyester, nylon or polypropylene.

Buckles 7 and tightening straps 11 perform the function of retaining and holding the tension on wrapper panel 2 when pallet wrapper 1 is in place and tightening straps 11 have been inserted through buckles 7 and tightened. Other tightening devices such as Velcro (Trademark) straps can also be used to maintain the required tension of panel 2 without detracting from the invention.

The number of buckles 7 and corresponding tightening straps 11 is dependent largely on the width of panel 2. It is necessary that a sufficient number of buckles and straps be provided to ensure that an even tension force can be applied across the width of panel 2. Therefore, for relatively small pallet wrappers one buckle 7 and tightening strap 11 located in the center of rods 13 would be sufficient. However, for very large pallet wrappers it may be necessary to provide three or more buckles 7 and a corresponding number of tightening straps 11 attached to rods 13 spaced along the width between the upper and lower edges 30–32 of panel 2.

The reusable pallet wrapper 1 of this invention is used by wrapping panel 2 around the perimeter of stack 28. Flap 5 extends from end 34, 35 or both ends 34–35 of panel 2 under tightening straps 11 and buckles 7, i.e. flap 5 rests against cartons 26. In some cases flap 5 can be tucked under panel 2 against cartons 26. Flap 5 can be either an extension of panel 2 or a separate portion attached to panel 2. Flap 5 is used to protect material that would otherwise be exposed through the gaps between straps 11 and buckles 7 connecting ends 34–35 of panel 2. The free ends 12 of tightening straps 11 are then placed through the corresponding buckles 7.

When tension is applied with tightening straps 11 the rods 13 cause an even tension across the width of panel 2 thereby eliminating pressure points on cartons 26. In addition, pallet wrapper 1 maintains a rigid line across the width of panel 2 thereby preventing buckling or bulging of wrapper panel 2.

In this arrangement it is possible to transport pallet 20 with stack 28 thereon in such a manner that cartons 26 are not damaged and items do not fall off pallet 20 when cartons 26 are properly stacked in a tight configuration.

Although the wrapper panel 2 shown in the figures is substantially rectangular, panel 2 could also be trapezoidal or any other shape that may be required to accommodate irregular pallet stacks 28. The rods 13 would still reinforce the ends of panel 2 no matter what its shape.

Figure 5:
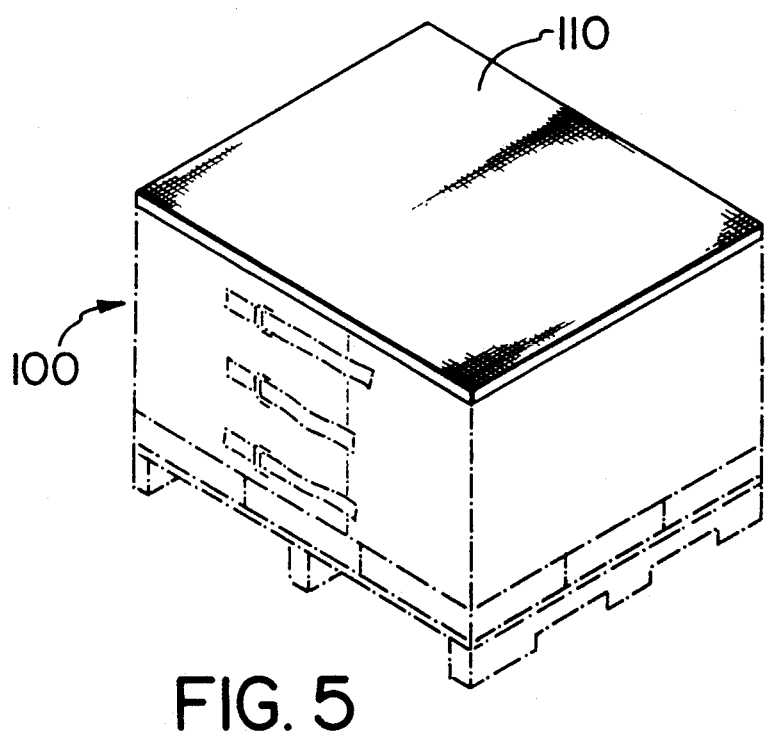
FIG. 5 is a perspective view of a stack of palletized materials having a modified version of the reusable pallet wrapper of the present invention positioned in place thereon.

Referring to FIG. 5, a modified form of the invention is shown holding stack 28 of cartons 26. In some circumstances it is desirable to protect the top of stack 28 of cartons 26. The modified form of the pallet wrapper is designated as numeral 100. Pallet wrapper 100 includes a top or hood 110 that is sewn or otherwise attached to upper edge 30 of panel 2. This hood will provide additional security and protection to cartons 26. The other components of this modified pallet wrapper 100 are identical to those previously described.

Although preferred embodiments of the invention have been described in detail, such description is intended to be illustrative rather than limiting, for some of the components of the wrapper can be variously modified so the scope of the invention is to be determined only by interpreting the claims.

The embodiments of the invention in which an exclusive property or privilege is claimed are defined as follows:

1. A pallet wrapper for stabilizing a cluster of articles, comprising:
   a panel of flexible material having first and second ends,
   a first sleeve formed at the first end of the panel, said first sleeve being substantially parallel to the first end and having a first aperture formed therein,
   a second sleeve formed proximate the second end of the panel, said second sleeve being substantially parallel to the second end and having a second aperture formed therein,
   a first rod extending within the first sleeve,
   a second rod extending within the second sleeve,
   a first strap extending through the first aperture, said first strap having a looped portion engaged around the first rod and an external portion located outside of the sleeve,
   a second strap extending through the second aperture, said second strap having a looped portion engaged around the second rod and an external portion located outside of the sleeve, and
   means for releasably engaging the external portions of the first and second strap to hold the pallet wrapper about the cluster of articles.

2. The pallet wrapper of claim 1, wherein the first end is substantially parallel to the second end.

3. The pallet wrapper of claim 1, wherein
   the first and second sleeve each have a plurality of apertures formed therein, and wherein
   a plurality of first straps extend through the plurality of apertures formed in the first sleeve, and
   a plurality of second straps extend through the plurality of apertures formed in the second sleeve.

4. The pallet wrapper of claim 1, wherein the means for releasable engaging the external portions of the first and second strap include a buckle.

5. The pallet wrapper of claim 1, further including a wrapper flap of flexible material having a first and second flap end wherein the first flap end of the wrapper flap is connected to one end of said wrapper panel.

6. The pallet wrapper of claim 1, further including a wrapper top of flexible material adapted to engage the panel between the first and second end to provide a protective top when the panel is wrapped around the cluster of articles.

* * * * *